(12) United States Patent
Miwa et al.

(10) Patent No.: US 9,849,934 B2
(45) Date of Patent: Dec. 26, 2017

(54) SHOCK ABSORBER

(71) Applicant: Showa Corporation, Gyoda-shi (JP)

(72) Inventors: Kazuhiro Miwa, Fukuroi (JP); Naoya Kuroiwa, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 63 days.

(21) Appl. No.: 15/066,155

(22) Filed: Mar. 10, 2016

(65) Prior Publication Data

US 2016/0288869 A1 Oct. 6, 2016

(30) Foreign Application Priority Data

Mar. 31, 2015 (JP) ................. 2015-074211

(51) Int. Cl.
*B62K 25/28* (2006.01)
*F16F 9/18* (2006.01)
*F16F 9/46* (2006.01)

(52) U.S. Cl.
CPC ............ *B62K 25/283* (2013.01); *F16F 9/185* (2013.01); *F16F 9/465* (2013.01); *F16F 2230/24* (2013.01)

(58) Field of Classification Search
CPC . B62K 25/283; F16F 9/185; F16F 9/19; F16F 9/34; F16F 9/44; F16F 9/465; F16F 2230/24

See application file for complete search history.

(56) References Cited

U.S. PATENT DOCUMENTS

| 5,439,085 A | 8/1995 | Woessner | |
|---|---|---|---|
| 5,960,915 A * | 10/1999 | Nezu | F16F 9/325 188/266.6 |
| 6,155,391 A * | 12/2000 | Kashiwagi | F16F 9/466 188/266.6 |
| 2011/0147147 A1* | 6/2011 | Murakami | F16F 9/464 188/314 |
| 2011/0203888 A1 | 8/2011 | Sönsteröd et al. | |
| 2012/0186924 A1 | 7/2012 | Hovén et al. | |

(Continued)

FOREIGN PATENT DOCUMENTS

| EP | 2628974 | * | 8/2013 |
|---|---|---|---|
| JP | 2013-06107 A | | 4/2013 |
| JP | 5290411 B | | 9/2013 |

OTHER PUBLICATIONS

Extended European Search Report dated Sep. 13, 2016 for the corresponding European Patent Application No. 16162128.9.

*Primary Examiner* — Vishal Sahni
(74) *Attorney, Agent, or Firm* — Leason Ellis LLP

(57) ABSTRACT

A shock absorber includes a cylinder in which oil is sealed, a piston slidably fitted into the cylinder, a piston rod connected to the piston and extending to the outside of the cylinder, and a damping force generating apparatus controlling a flow of the oil generated by the sliding of the piston inside the cylinder. The damping force generating apparatus includes a valve body generating a damping force by being opened and closed on a flow path in which the oil flows, a valve seat closing the flow path when the valve body is seated, and an actuator generating thrust to the valve body in a valve closing direction. The valve seat has a first elastic body which is elastically deformable in the valve closing direction of the valve body.

8 Claims, 7 Drawing Sheets

(56) References Cited

U.S. PATENT DOCUMENTS

| | | | |
|---|---|---|---|
| 2014/0231200 A1* | 8/2014 | Katayama | F16F 9/325 |
| | | | 188/314 |
| 2014/0291089 A1* | 10/2014 | Konakai | F16F 9/34 |
| | | | 188/314 |
| 2014/0291091 A1 | 10/2014 | Sönseröd et al. | |
| 2014/0353099 A1* | 12/2014 | Yamashita | F16F 9/3485 |
| | | | 188/314 |

* cited by examiner

SHOCK ABSORBER

CROSS-REFERENCE TO RELATED APPLICATIONS

The present application claims priority under 35 U.S.C. §119 to Japanese Patent Application No. 2015-074211, filed Mar. 31, 2015. The contents of this application are incorporated herein by reference in their entirety.

BACKGROUND OF THE INVENTION

1. Technical Field

The present invention relates to a shock absorber generating a damping force by controlling a flow of oil generated by sliding movement of a piston inside a cylinder.

2. Related Art

As a shock absorber used as a rear cushion which suspends a rear wheel of a motorcycle with respect to a vehicle body, for example, there is known a shock absorber including a cylinder in which oil is sealed, a piston slidably fitted into the cylinder, a piston rod connected to the piston and extending to an outside of the cylinder, and a damping force generating apparatus adjusting damping force by controlling a flow of oil generated by sliding of the piston inside the cylinder. As a shock absorber in which variable damping force is generated, there is also known a shock absorber using a solenoid actuator as a damping force generating apparatus which is configured to control a flow amount of oil by changing a current quantity.

Such a damping force generating apparatus is known to include a pressure control valve for controlling a pressure which has a valve body, a valve seat on which the valve body is seated, a plunger biasing the valve body to the valve seat in the axial direction to adjust a valve-opening pressure, and a solenoid actuator adjusting thrust of the plunger. In the above pressure control valve, the valve body and the plunger are pushed back by a pressure difference between front and rear of the pressure control valve to space the valve body from the valve seat for allowing oil flow (for example, see Japanese Patent No. 5,290,411).

SUMMARY OF THE INVENTION

However, in the related-art damping force generating apparatus having the above structure, response delay of the valve body may occur due to the inertia acted on the plunger and the damping force may overshoot. In particular, overshoot of damping force is increased due to an opening delay of the pressure control valve when the pressure rises. Furthermore, opening degree of the pressure control valve may vary by self-excited vibration of the valve body, and the damping force may oscillate and become unstable.

The present invention has been made in view of the above, and the object thereof is to provide a shock absorber capable of suppressing overshoot of damping force caused by response delay of the pressure control valve and the oscillation of the damping force caused by the self-excited vibration of the valve body.

According to an embodiment of the present invention, there is provided a shock absorber including a cylinder in which oil is sealed, a piston slidably fitted into the cylinder, a piston rod connected to the piston and extending to an outside of the cylinder, and a damping force generating apparatus controlling a flow of the oil generated by a sliding movement of the piston inside the cylinder, in which the damping force generating apparatus includes a valve body generating a damping force by being opened and closed on a flow path in which the oil flows, a valve seat closing the flow path when the valve body is seated, and an actuator generating thrust to the valve body in a valve closing direction, and the valve seat has a first elastic body which is elastically deformable in the valve closing direction of the valve body.

According to the present invention, the shock absorber capable of suppressing overshoot of damping force caused by response delay of the pressure control valve and the oscillation of the damping force caused by the self-excited vibration of the valve body can be provided.

DESCRIPTION OF EMBODIMENTS

An exemplary embodiment of the present invention will be explained with reference to the drawings.

[Structure of Shock Absorber]

Figure 1:
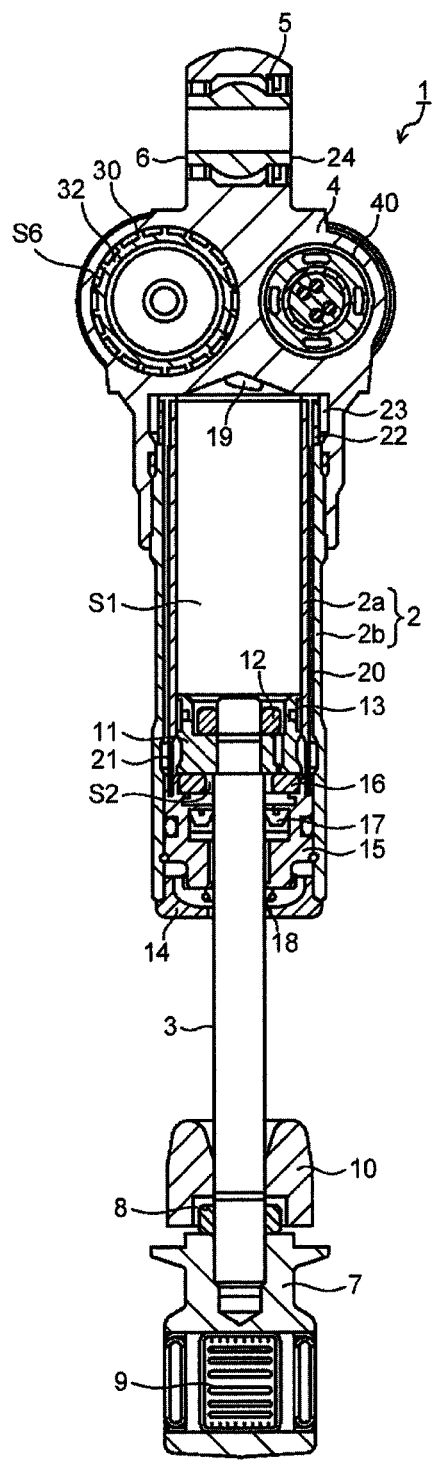
FIG. 1 is a vertical cross-sectional view of a shock absorber according to an embodiment.
Figure 2:
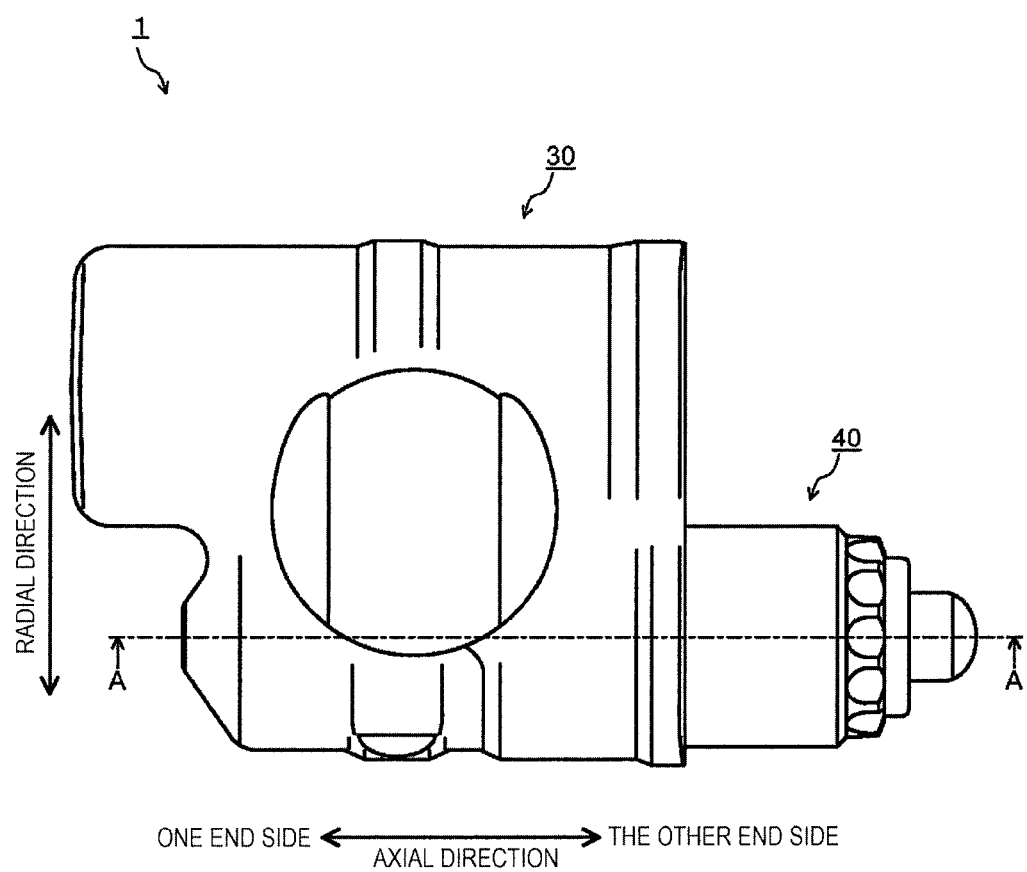
FIG. 2 is a top view of a damper case portion of the shock absorber of FIG. 1.
Figure 3:
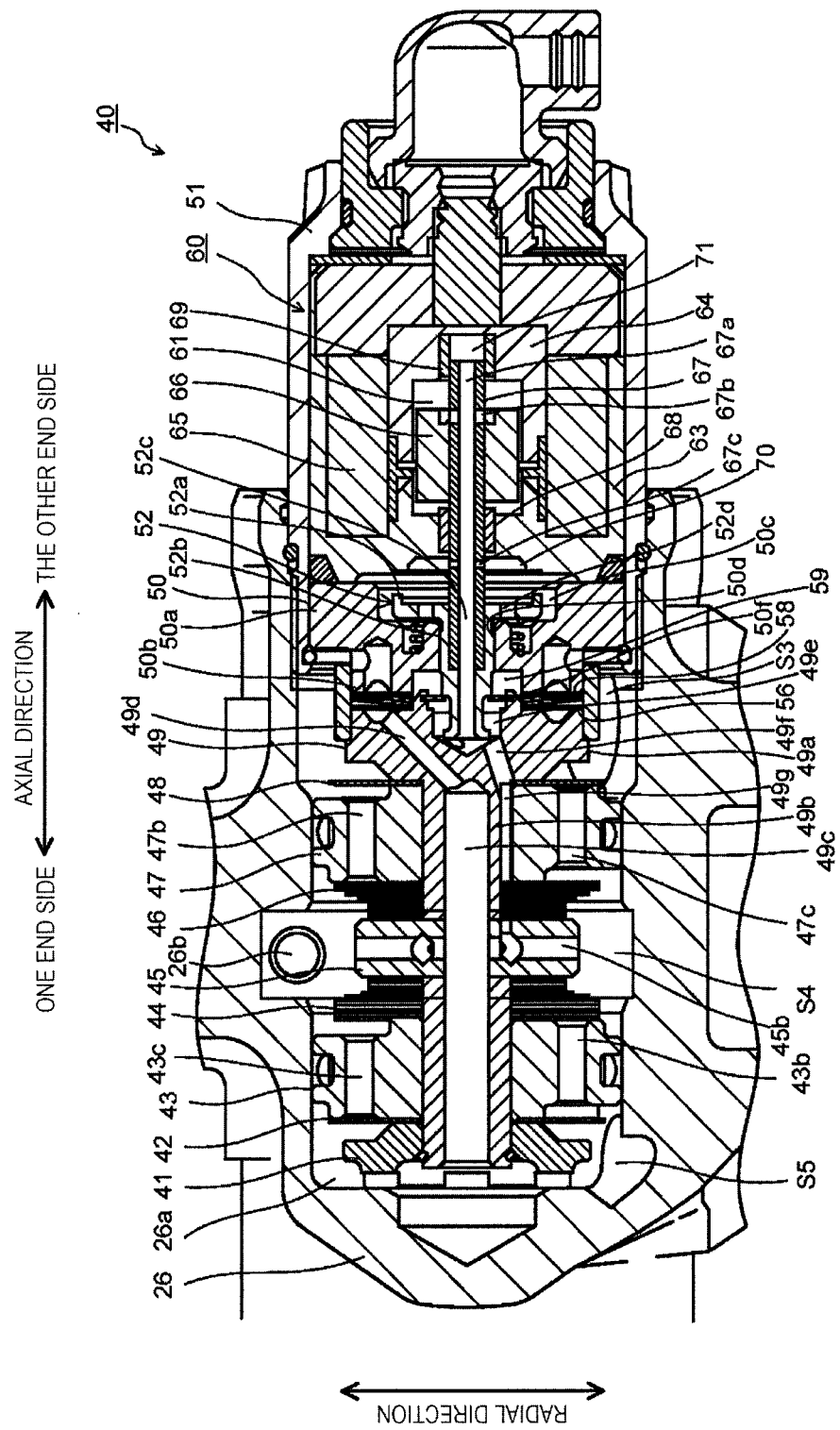
FIG. 3 is an enlarged view of a relevant part of A-A cross section of FIG. 2.
Figure 4:
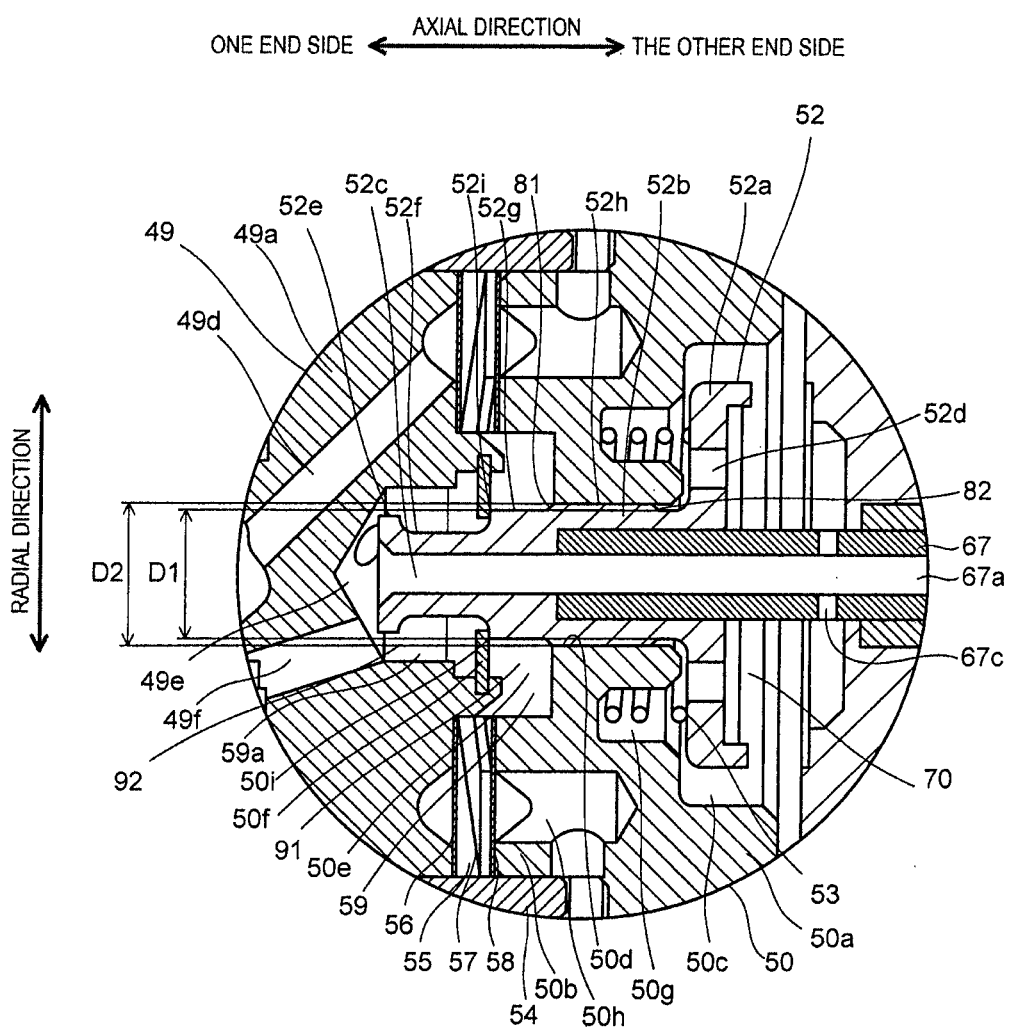
FIG. 4 is an enlarged detailed view of a relevant part of FIG. 3.
Figure 5:
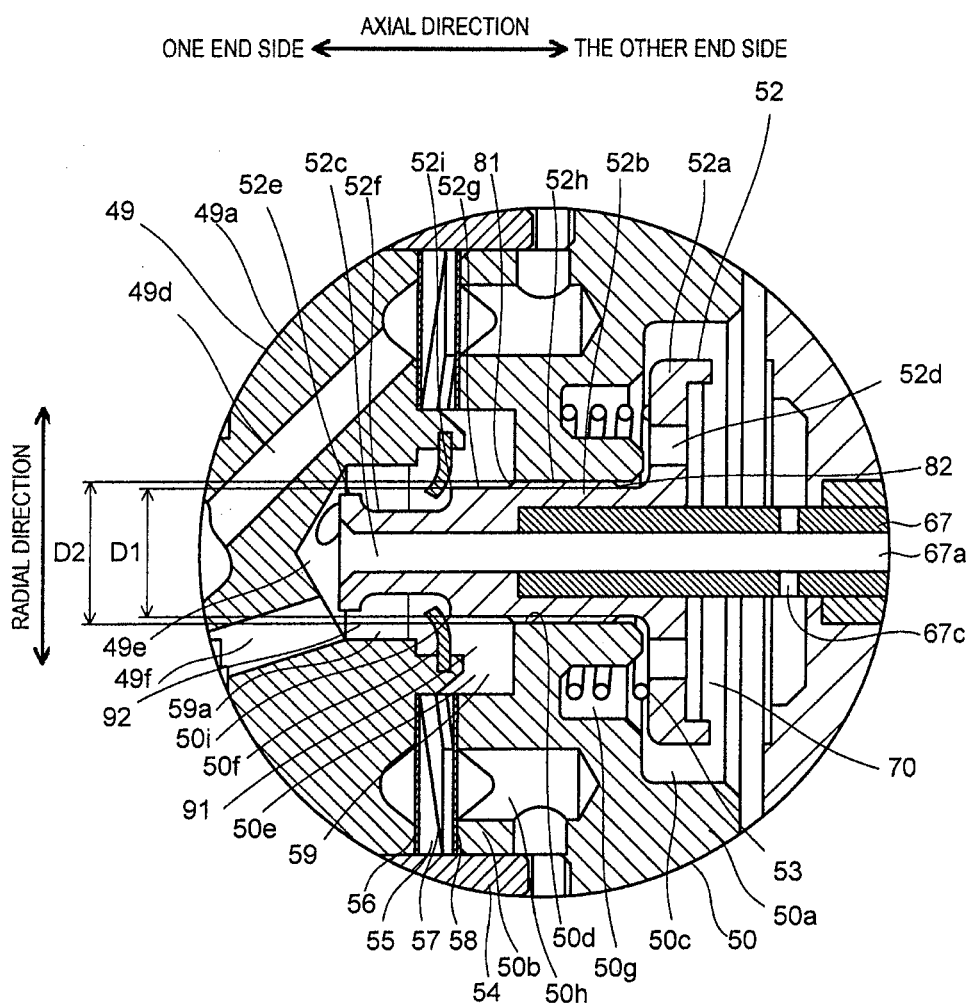
FIG. 5 is an enlarged detailed view of the relevant part of FIG. 3.

FIG. 1 is a vertical cross-sectional view of a shock absorber 1 according to an embodiment. FIG. 2 is a top view of a damping force generating apparatus of FIG. 1. FIG. 3 is an enlarged view of a relevant part of A-A cross section of FIG. 2. FIG. 4 and FIG. 5 are enlarged detailed views of a relevant part of FIG. 3.

The shock absorber 1 according to the embodiment is an inverted-type rear cushion which suspends a rear wheel of a motorcycle with respect to a vehicle body. The shock absorber 1 is configured by inserting part of a piston rod 3 attached to an axle side into a cylinder 2 attached to a vehicle body side and interposing a suspension spring (not-shown) between the cylinder 2 and the piston rod 3 as shown in FIG. 1.

The cylinder 2 includes an inner cylinder 2a and an outer cylinder 2b forming a coaxial double tube. A damper case portion 4 is attached to an upper end portion of the cylinder 2. The damper case portion 4 is provided with a reservoir 30 (explained later) and a damping force generating apparatus 40 as shown in FIG. 2. Part of the damper case portion 4 configures a vehicle-body side attaching portion 24. A cylindrical rubber bush 5 is inserted and held in the vehicle-body side attaching portion 24 in a horizontal direction (right and left direction in FIG. 1). An approximately cylindrical collar 6 is inserted and held inside the rubber bush 5 in the horizontal direction. The upper end portion of the cylinder 2 is attached to the vehicle body of the motorcycle by a shaft inserted to the collar 6 which is inserted and held in the vehicle-body side attaching portion 24.

An axle side mounting member 7 is screwed to a lower end portion of the piston rod 3. The axle side mounting member 7 is firmly fixed by a rock nut 8. The lower end portion of the piston rod 3 is attached to a rear wheel supporting member of the motorcycle through a shaft inserted to a cylindrical collar 9 which is inserted and held in the axle side mounting member 7 in the horizontal direction (right and left direction of FIG. 1). A bump rubber 10 for preventing the shock absorber 1 bottoming out in a most compressed state is fixed just above the axle side mounting member 7 at the lower end portion of the piston rod 3 by inserting the piston rod 3 into the bump rubber 10.

A piston 11 is fixed to an upper end portion of the piston rod 3, which faces the inside of the inner cylinder 2a of the cylinder 2 with a nut 12. The piston 11 is fitted so as to be slidable in the vertical direction on an inner periphery of the inner cylinder 2a through a piston ring 13 held in an outer periphery of the piston 11.

A space as a working oil chamber in which oil inside the inner cylinder 2a of the cylinder 2 works is sectioned by the piston 11 into two oil chambers which are a piston-side oil chamber S1 on an upper side and a rod-side oil chamber S2 on a lower side. Of the two oil chambers the oil chamber positioned at a side of the piston 11 is the piston-side oil chamber S1 and the oil chamber positioned at a side of the piston rod 3 is the rod-side oil chamber S2. The piston-side oil chamber S1 and the rod-side oil chamber S2 are filled with the oil. That is, in the shock absorber 1, the space inside the inner cylinder 2a of the cylinder 2 as the working oil chamber is sectioned by the piston 11 to have the rod-side oil chamber S2 formed closer to the axle side with respect to the piston 11 and the piston-side oil chamber S1 formed closer to the vehicle body side with respect to the piston 11.

As shown in FIG. 1, a cap 14 is attached to a portion where the piston rod 3 is inserted at an opening of a lower surface of the outer cylinder 2b of the cylinder 2. A rod guide 15 into which the piston rod 3 penetrates so as to be slidable in the vertical direction at a center thereof is fitted to an inner periphery of a lower end portion of the outer cylinder 2b. A rebound rubber 16 is fitted to an inner periphery of an opening of an upper end of the rod guide 15. An oil seal 17 is fitted to an inner periphery in an intermediate portion of the rod guide 15, and a dust seal 18 is fitted to an outer periphery of a lower end portion. Leakage of oil from the cylinder 2 is prevented by a sealing effect of the oil seal 17, and infiltration of dust into the cylinder 2 is prevented by a sealing effect of the dust seal 18.

In the damper case portion 4, an oil hole 19 opening to the piston-side oil chamber S1 formed inside the inner cylinder 2a of the cylinder 2 is formed as shown in FIG. 1. The piston-side oil chamber S1 is communicated to a first oil chamber S3 (see FIG. 3) of the damping force generating apparatus 40 (explained later) through the oil hole 19. A cylindrical flow path 20 is formed between the inner cylinder 2a and the outer cylinder 2b of the cylinder 2. One end (lower end) of the flow path 20 is communicated to the rod-side oil chamber S2 through plural oil holes 21 formed in a lower end portion of the inner cylinder 2a. On the other hand, the other end (upper end) of the flow path 20 is communicated to a third oil chamber S5 (see FIG. 3) of the damping force generating apparatus 40 (explained later) through plural oil holes 22 formed in an upper end of the outer cylinder 2b and a flow path 23 formed between the damper case portion 4 and the outer cylinder 2b.

In the shock absorber 1 according to the embodiment, the reservoir 30 and the damping force generating apparatus 40 are arranged side by side inside the damper case portion 4 fitted to the upper end of the cylinder 2. The reservoir 30 includes a pouched bladder 32. Here, the bladder 32 is a member formed in a pouch shape by an elastic body such as rubber, which can be inflated and deflated. An inside of the bladder 32 is filled with gas such as air. Then, a space outside the bladder 32 in the reservoir 30 forms a reservoir oil chamber S6. An inside of the reservoir oil chamber S6 is filled with the oil. The reservoir oil chamber S6 of the reservoir 30 compensates a volume of the piston rod 3 changed when the piston rod 3 is inserted to or retracted from the cylinder 2.

Next, detail of structure of the damping force generating apparatus 40 will be explained with reference to FIG. 3 to FIG. 5.

As shown in FIG. 3, the damping force generating apparatus 40 includes a bottomed cylindrical damper case 26 formed in the damper case portion 4 (see FIG. 1) and a case 51 one end side of which is fitted to an inner periphery of an opening in the other end side of the damper case 26. Inside a concave portion 26a of the damper case 26, a valve stopper 41, a compression-side outlet check valve 42, an extension-side valve seat member 43, an extension-side valve 44, a first flow path member 45, a compression-side valve 46, a compression-side valve seat member 47, an extension-side outlet check valve 48, a second flow path member 49 and a valve body housing member 50 are sequentially arranged in an axial direction from one end side toward the other end side. The damping force generating apparatus 40 includes a solenoid actuator 60 inside the case 51 adjacent to the valve body housing member 50. The shock absorber 1 according to the embodiment uses the solenoid actuator 60 as described above. However, the present invention is not limited to this, and an actuator using a drive mechanism other than the solenoid may be used.

A space closer to the one end side from the extension-side valve seat member 43 inside the concave portion 26a is the third oil chamber S5 which is communicated to the rod-side oil chamber S2 (see FIG. 1). A space between the extension-side valve seat member 43 inside the concave portion 26a and the compression-side valve seat member 47 is a second oil chamber S4 which is communicated to the reservoir oil chamber S6 (see FIG. 1) through a communication path 26b and a space between the compression-side valve seat member 47 and the valve body housing member 50 is the first oil chamber S3 communicated to the piston-side oil chamber S1 (see FIG. 1).

The second flow path member 49 has a large diameter portion 49a positioned at the other end side and a small diameter portion 49b extending from the large diameter portion 49a toward one end side. The valve stopper 41, the compression-side outlet check valve 42, the extension-side valve seat member 43, the extension-side valve 44, the first flow path member 45, the compression-side valve 46, the compression-side valve seat member 47 and the extension-side outlet check valve 48 respectively have an annular shape, and the small diameter portion 49b of the second flow path member 49 is positioned at a central part of these members.

That is, the extension-side outlet check valve 48, the compression-side valve seat member 47, the compression-side valve 46, the first flow path member 45, the extension-side valve 44, the extension-side valve seat member 43 and the compression-side outlet check valve 42 are fitted to the small diameter portion 49b of the second flow path member 49, and an end portion of the second flow path member 49 at the one end side is locked with the valve stopper 41.

In the extension-side valve seat member 43 formed in the annular shape, plural extension-side inlet oil paths 43b and extension-side outlet oil paths 43c are formed along a circumferential direction. The extension-side inlet oil paths 43b and the extension-side outlet oil paths 43c are alternately provided along the peripheral direction of the extension-side valve seat member 43. The extension-side valve 44 formed of plural disc valves is arranged in the other end side (outlet side) of the extension-side inlet oil paths 43b so as to abut on the other end side surface of the extension-side valve seat member 43. On the other hand, the compression-side outlet check valve 42 formed of a disc valve is arranged in one end (outlet side) of the extension-side outlet oil paths 43c so as to abut on one end side surface of the extension-side valve seat member 43.

Similarly, plural compression-side inlet oil paths 47b and extension-side outlet oil paths 47c are formed in the annular compression-side valve seat member 47 along the circumferential direction. The compression-side inlet oil paths 47b and extension-side outlet oil paths 47c are alternately provided along the circumferential direction of the compression-side valve seat member 47. Then, the compression-side valve 46 formed of plural disc valves is arranged in one end (outlet side) of the compression-side inlet oil paths 47b so as to abut on one end side surface of the compression-side valve seat member 47. On the other hand, the extension-side outlet check valve 48 formed of a disc valve is arranged in the other end side (outlet side) of the extension-side outlet oil paths 47c so as to abut on the other end side surface of the compression-side valve seat member 47.

Plural oil paths 45b radially extending from a central part in the radial direction are formed in the annular first flow path member 45. An oil path 49c in a straight line shape is formed along the axial direction inside the small diameter portion 49b of the second flow path member 49, and an oil path 49d communicated to the oil path 49c and obliquely extending in a direction toward the other end as well as in the outer peripheral direction is formed in the large diameter portion 49a. Furthermore, an oil path 49e is formed in a concave state in a central part of the large diameter portion 49a at the other end side, and an oil path 49f communicated to the oil path 49e as well as extending in one end side and penetrating the large diameter portion 49a is formed. A groove extending to one end side along the axial direction of an outer peripheral surface of the small diameter portion 49b and extending in the axial direction of the small diameter portion 49b to a place where the oil paths 45b of the first flow path member 45 are positioned is formed in one end side of the oil path 49f. Due to the groove, a gap is formed between an outer peripheral surface of the small diameter portion 49b and the compression-side valve 46, the compression-side valve seat member 47 and an inner periphery of the extension-side outlet check valve 48, and the gap forms an oil path 49g. The oil path 49g is communicated to the oil paths 45b formed in the first flow path member 45.

As shown in FIG. 4, the valve body housing member 50 is formed in the annular shape. The other end side of the valve body housing member 50 forms a large diameter portion 50a having a larger outer diameter and one end side of the valve body housing member 50 forms a small diameter portion 50b having a smaller outer diameter than the large diameter portion 50a. In a central part of the valve body housing member 50, there is formed a through hole including a large diameter hole 50c, a small diameter hole 50d and a middle diameter hole 50e the diameters of which are gradually reduced in a stepwise fashion from the other end side to the one end side. A valve body 52 is arranged in the through hole.

The valve body 52 has a disc-shaped flange portion 52a at the other end side and a needle portion 52b extending from the central portion of the flange portion 52a toward one end side. In the center of the needle portion 52b, a communication path 52c formed of a through hole penetrating the inside of the needle portion 52b and the flange portion 52a along the axial direction is formed. That is, the valve body 52 has the communication path 52c in which a plunger chamber 61 (explained later) is communicated to a downstream side of an oil flow direction with respect to a place where the valve body 52 is seated on the valve seat 50f. Furthermore, oil paths 52d formed of through holes penetrating the flange portion 52a are formed in the flange portion 52a along the circumferential direction.

A large diameter portion 52e is formed at a tip end portion (end portion of one end side) of the needle portion 52b, and a first step portion 52f having a smaller diameter than the large diameter portion 52e is formed at a rear end side (the other end side) of the large diameter portion 52e. At a rear end side (the other end side) of the first step portion 52f, a second step portion 52g having a larger diameter than the first step portion 52f and a smaller diameter than a sliding portion 52h provided at a rear end side (the other end side) of the second step portion 52g is formed. An outer diameter of the second step portion 52g is D1 and an outer diameter of the sliding portion 52h is D2. An annular-shaped pressure receiving portion 81 (a first pressure receiving portion in claims) which is at least a part of the valve body 52 is formed due to the difference between the outer diameter D2 and the outer diameter D1. A pressure receiving area of the pressure receiving portion 81 corresponds to an area of an annular portion formed due to the difference between the outer diameter D2 and the outer diameter D1 (i.e. D2–D1).

A step portion at the rear end side (the other end side) of the first step portion 52f is a seating portion 52i. The seating portion 52i is seated on a valve seat portion 50i in an inner peripheral portion of the valve seat 50f, which is arranged in the middle diameter hole 50e of the valve body housing member 50 so as to protrude in the inner peripheral side of the middle diameter hole 50e, thereby closing an oil path formed of the middle diameter hole 50e. The valve seat 50f is formed of an elastic body (a first elastic body in claims) which can be elastically deformed in a valve opening direction (one end side) of the valve body 52 by the oil pressure, which is formed in an annular shape. In the present embodiment, the valve seat 50f is formed of a disc valve, in which an outer peripheral portion thereof is fixed and an inner peripheral portion including the valve seat portion 50i can be bent to the valve closing direction (one end side) of the valve body 52 by the oil pressure. The valve body 52 can move along the axial direction by the sliding portion 52h sliding with respect to the small diameter hole 50d of the valve body housing member 50. The outer diameter D1 of the seating portion 52i which is seated on the valve seat portion 50i in the valve body 52 is smaller than the outer diameter D2 which is the largest diameter of the pressure receiving surface, which receives an oil pressure inside the oil chamber 59, of the pressure receiving portion 81. Therefore, the seating portion 52i of the valve body 52 generates a damping force by being opened and closed on the flow path in which the oil flows from an oil chamber 59 to an oil chamber 59a and the oil path 49e formed in the middle diameter hole 50e. The natural frequency of the valve seat 50f is higher than that of the valve body 52. Accordingly, occurrence of self-excited vibration in the valve body 52 can be prevented.

An annular groove 50g opening to a large diameter hole 50c is formed in the valve body housing member 50 so as to be positioned around the small diameter hole 50d, and a coil spring 53 (a second elastic body in claims) is arranged inside the groove 50g. The other end side of the coil spring 53 abuts on a surface in one end side of the flange portion 52a of the valve body 52, which biases the valve body 52 to the valve opening direction (the other end side). A working rod 67 of the solenoid actuator 60 is fitted to the other end side of the flange portion 52a and the valve body 52 is biased to the valve closing direction by the working rod 67.

When the valve body 52 is seated on the valve seat 50f, the flow path is closed and contacts the valve seat 50f. Accordingly, even when the valve seat 50f is elastically deformed in the valve opening direction, the state where the flow path is closed is maintained, and the flow path is closed. On the other hand, when the valve seat 50f is elastically deformed in the valve closing direction, the flow path is opened by separating the valve body 52 from the valve seat 50f.

A tubular spacer 54 is attached so as to surround one end side of the small diameter portion 50b of the valve body housing member 50 and the other end side of the large diameter portion 49a of the second flow path member 49. A gap is provided between the small diameter portion 50b and the large diameter portion 49a by the spacer 54, and an oil chamber 55 surrounded by the small diameter portion 50b, the large diameter portion 49a and the spacer 54 is formed. In the oil chamber 55, an extension-side check valve 56 formed of a disc valve, an annular shaped plate spring 57, and a compression-side check valve 58 formed of a disc valve are sequentially arranged from one end side so as to be sandwiched between the large diameter portion 49a and the small diameter portion 50b. Then, the plate spring 57 biases the extension-side check valve 56 to the large diameter portion 49a and biases the compression-side check valve 58 to the small diameter portion 50b side.

In the valve body housing member 50, an oil path 50h which communicates the first oil chamber S3 (see FIG. 3) to the oil chamber 55 is formed, and the compression-side check valve 58 is arranged so as to cover an opening of the oil path 50h with respect to the oil chamber 55. Then, the compression-side check valve 58 allows the flow of the oil from the oil path 50h to the oil chamber 55 as well as blocks the flow of the oil from the oil chamber 55 to the oil path 50h.

On the other hand, the extension-side check valve 56 is arranged so as to cover an opening with respect to the oil chamber 55 of the oil path 49d formed inside the large diameter portion 49a of the second flow path member 49, which allows the flow of the oil from the oil path 49d into the oil chamber 55 as well as blocks the flow of the oil from the oil chamber 55 to the oil path 49d.

The oil chamber 55 is further communicated to the middle diameter hole 50e of the valve body housing member 50, and the oil chamber 59 is formed between the middle diameter hole 50e and the valve body 52.

The valve body 52 is biased in the valve closing direction by the solenoid actuator 60, and the pressure receiving portion 81 of the valve body 52, namely, a boundary portion between the second step portion 52g of the valve body 52 and the sliding portion 52h is normally positioned in a place of the oil chamber 59 (middle diameter hole 50e) of the valve body housing member 50. As described above, the outer diameter of the second step portion 52g is D1, and the outer diameter of the sliding portion 52h is D2. Therefore, a pressure corresponding to the pressure receiving area of the pressure receiving portion 81 as the annular region formed due to the difference between the outer diameter D2 and the outer diameter D1 (D2–D1) is applied in the direction in which the valve body 52 is opened. Then, when the oil flows into the oil chamber 59 and the oil pressure of a given amount or more is applied on the pressure receiving surface of the valve body 52, the valve body 52 opens against a pressing force of the solenoid actuator 60 and the oil flows into the second oil chamber S4 shown in FIG. 3 through the oil path 49e, the oil path 49f and so on formed in the second flow path member 49. For example, when an oil pressure inside the oil chamber 59 is suddenly increased and the movement of the valve body 52 does not catch up with the increase, the inner peripheral portion including the valve seat portion 50i of the valve seat 50f is bent to the one end side and a gap is formed between the inner peripheral portion and the seating portion 52i of the valve body 52, which generates the flow of the oil to the oil path 49e as shown in FIG. 5.

In this case, the oil chamber 59 and so on between the oil chamber 55, the middle diameter hole 50e and the valve body 52 correspond to a first flow path 91 in claims which is in an upstream side of the oil flowing direction than the valve seat portion 50i. The oil chamber 59a, the oil path 49e, the oil path 49f and the like correspond to a second flow path 92 in claims which is in a downstream side of the oil flowing direction than the valve seat portion 50i.

As shown in FIG. 3, the solenoid actuator 60 includes a core 63, the working rod 67, a plunger 66, a coil 65 and a core 64.

The solenoid actuator 60 is configured by housing two bottomed cylindrical cores 63 and 64, the annular coil 65, the plunger 66 housed inside the cores 63 and 64, the hollow working rod 67 penetrating the shaft center portion of the plunger 66 an the like inside the cylindrical case 51. Both end portions of the working rod 67 in the axial direction are supported by cylindrical guide bushes 68 and 69 so as to move in the axial direction. The valve body 52 is fixed to one end side of the working rod 67, which faces the inside of the large diameter hole 50c of the valve body housing member 50. An oil path 67a is formed along the axial direction in the central portion of the working rod 67. In a place where an rear end side end portion (the other end side end portion) of the plunger 66 of the working rod 67, an oil path 67b communicating the oil path 67a to the plunger chamber 61 which houses the plunger 66 is formed. Furthermore, an oil path 67c communicating the oil path 67a to the inside of the large diameter hole 50c of the valve body housing member 50 is formed in the vicinity of a tip side end portion (one end side end portion) of the working rod 67. The oil flowing into the large diameter hole 50c allows a back pressure to act on the valve body 52. Therefore, the inside of the large diameter hole 50c corresponds to a valve body back pressure chamber 70. That is, the valve body back pressure chamber 70 is arranged between the second flow path 92 including the oil chamber 59a, the oil path 49e, the oil path 49f and the like and the plunger chamber 61 so as to be communicated to them as well as allows an oil pressure in the valve closing direction as the back pressure to act on the valve body 52. In this case, a pressure receiving portion 82 (a second pressure receiving portion in claims) in the valve body 52 actually generating the back pressure is at least part of the valve body 52, which is different from the pressure receiving portion 81. A pressure receiving area of the pressure receiving portion 82 is the same as the pressure receiving area of the pressure receiving portion 81, namely, the area of the annular portion formed due to the difference between the outer diameter D2 and the outer diameter D1.

The oil inside the oil path 49e as the flow path in the downstream side of the oil flowing direction than the valve seat portion 50*i* flows into the plunger chamber 61 through the communication path 52*c* formed in the valve body 52 and the oil path 67*a*, the oil path 67*b* formed in the working rod 67, and the plunger chamber 61 is filled with the oil. An oil reservoir chamber 71 is formed in the other end side of the plunger chamber 61, and the oil reservoir chamber 71 is also filled with the oil flowing in through the communication path 52*c* and the oil path 67*a*. Similarly, the oil inside the oil path 49*e* as the flow path in the downstream side of the oil flowing direction than the valve seat portion 50*i* flows into the valve body back pressure chamber 70 through the communication path 52*c* formed in the valve body 52 and the oil path 67*a*, the oil path 67*c* formed in the working rod 67, and the valve body back pressure chamber 70 is filled with the oil. That is, the plunger chamber 61 is communicated to the downstream side of the oil flowing direction than a place where the seating portion 52*i* of the valve body 52 is seated on the valve seat portion 50*i* of the valve seat 50*f*. Therefore, oil pressures in the plunger chamber 61, the oil reservoir chamber 71 and the valve body back pressure chamber 70 are the same pressure as an oil pressure in the oil path 49*e*, and an oil pressure in the oil path 49*e* is the same as an oil pressure in the second oil chamber S4 communicated to the oil path 49*e*. Accordingly, the oil pressures in the plunger chamber 61, the oil reservoir chamber 71 and the valve body back pressure chamber 70 are the same as the oil pressure in the second oil chamber S4.

The oil after being damped in the extension-side valve 44 and the oil after being damped in the compression-side valve 46 are introduced into the second oil chamber S4. The second oil chamber S4 is communicated to the reservoir 30. Accordingly, variation of the oil pressure is small and the oil pressure is low in the second oil chamber S4 as compared with the first oil chamber S3 and the third oil chamber S5.

As the flow of the oil is reduced and the pressure is lower in the embodiment as compared with the case where the plunger camber 61, the oil reservoir chamber 71 and the valve body back pressure chamber 70 are communicated to the first oil chamber S3 and the third oil chamber S5 where pressure variation is larger and the pressure is higher, the flow of pushing the oil and contamination included in the oil such as iron power generated by abrasion of the valve and so on into the plunger chamber 61, the oil reservoir chamber 71 and the valve body back pressure chamber 70 is hardly generated, therefore, the possibility of contamination intrusion can be reduced. According to the structure, for example, the possibility that contamination is caught in the plunger 66, the sliding portion of the working rod 67 and so on to affect the driving of the valve body 52 can be reduced. Furthermore, the possibility that air bubbles are mixed into the plunger chamber 61 and the valve body back pressure chamber 70, namely, the occurrence of air entrainment can be reduced.

[Operations of Shock Absorber]

Figure 6:
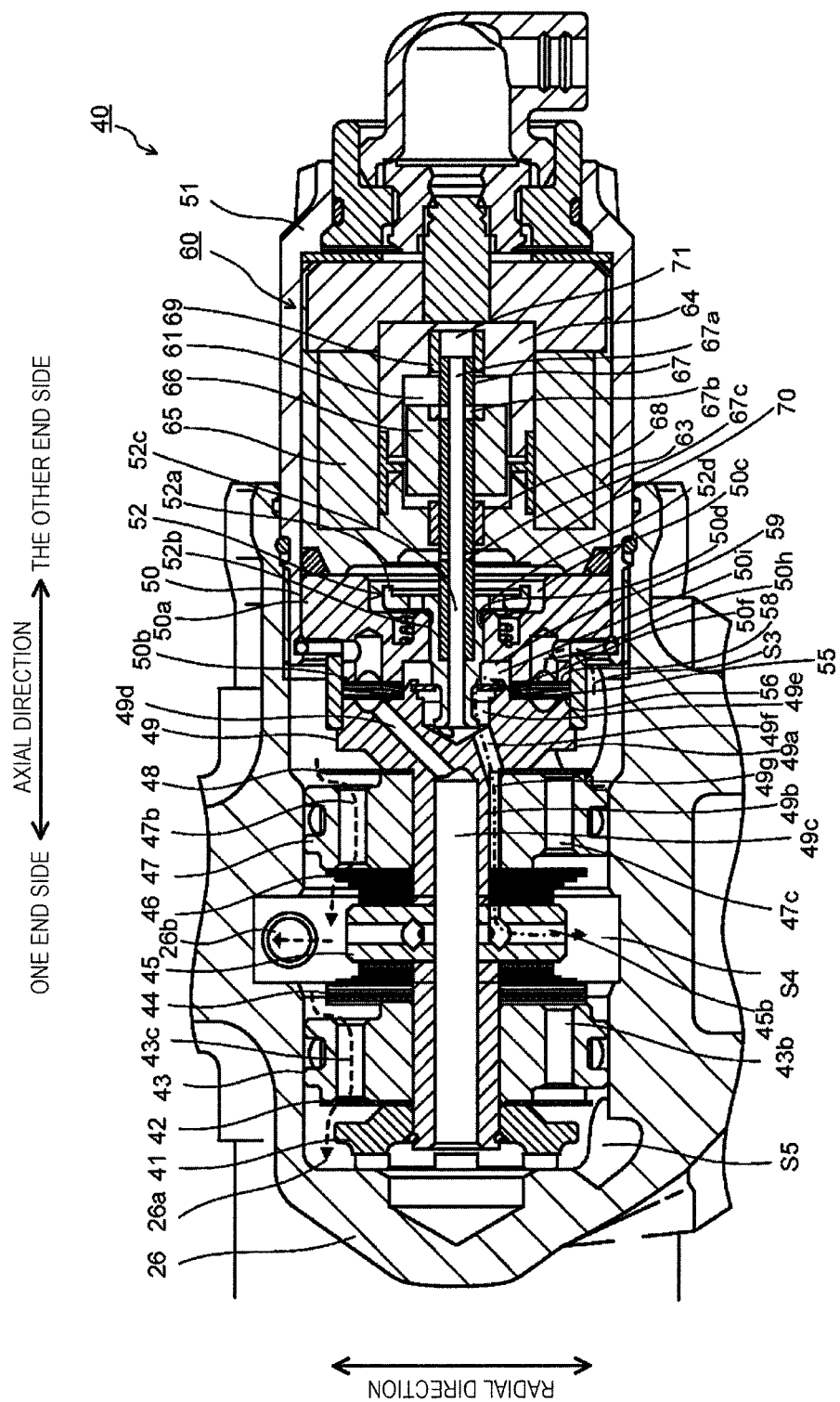
FIG. 6 is a view showing the flow of oil during a compression stroke in a damping force generating apparatus.
Figure 7:
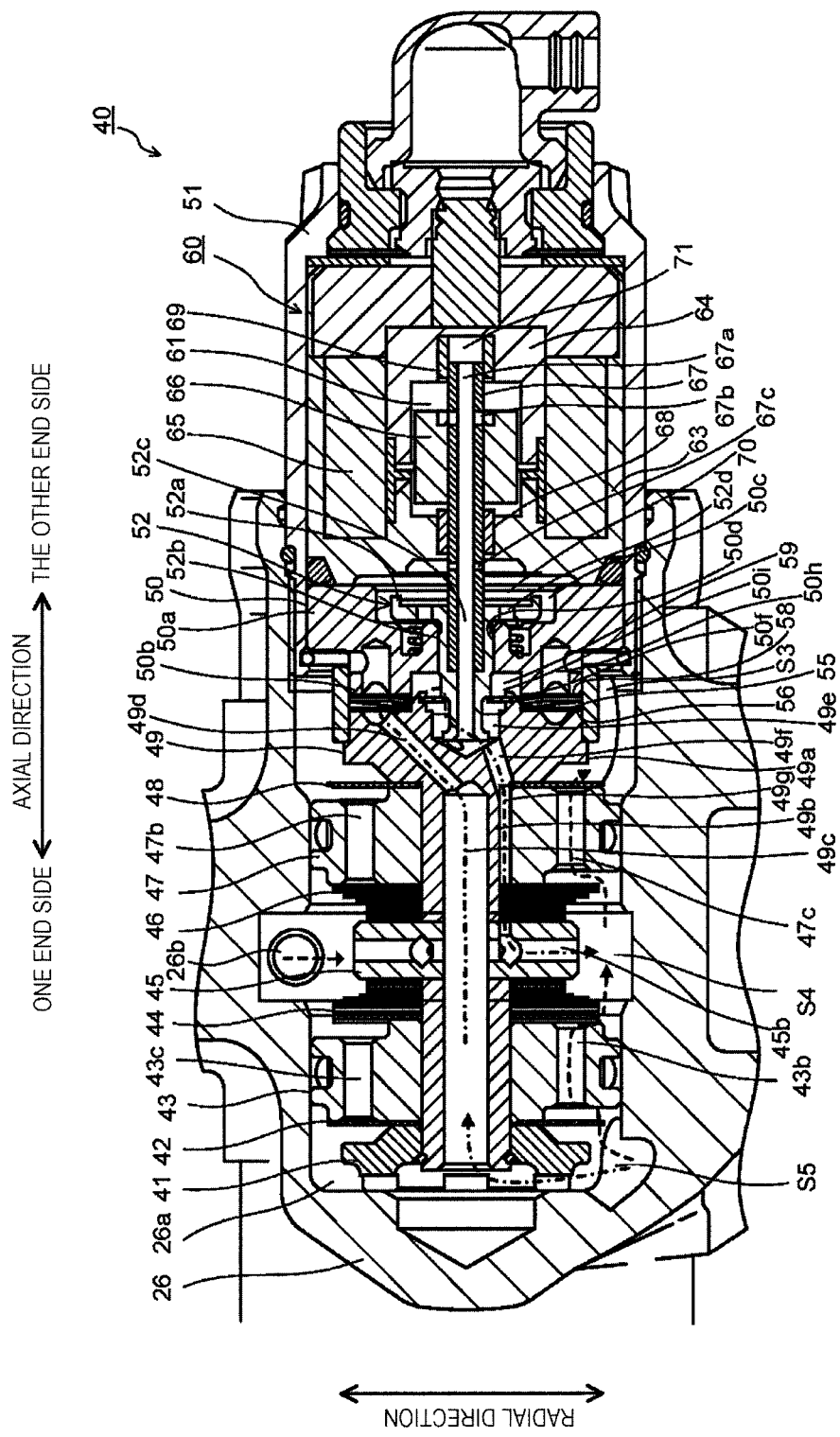
FIG. 7 is a view showing the flow of oil during an extension stroke in the damping force generating apparatus.

Next, operations of the shock absorber 1 having the above structure during the compression stroke and during the extension stroke will be explained with reference to FIG. 6 and FIG. 7. FIG. 6 shows the flow of the oil during the compression stroke in the damping force generating apparatus 40 of the shock absorber 1 according to the embodiment, and FIG. 7 shows the flow of the oil during the extension stroke in the damping force generating apparatus 40 of the shock absorber 1 according to the embodiment.

(Compression Stroke)

When the rear wheel moves up and down following road surface unevenness during a travel of the motorcycle, the cylinder 2 and the piston rod 3 of the shock absorber 1 suspending the rear wheel extend and contract. In the compression stroke in which the piston rod 3 moves up relatively to the cylinder 2, the oil inside the piston-side oil chamber S1 is compressed by the piston 11, and the pressure in the piston-side oil chamber S1 is increased. Then, the oil inside the piston-side oil chamber S1 is supplied through the oil hole 19 shown in FIG. 1 to the first oil chamber S3 of the damping force generating apparatus 40 shown in FIG. 6.

The oil supplied to the first oil chamber S3 of the damping force generating apparatus 40 flows into the second oil chamber S4 during the compression stroke, then, part of the oil flows into the reservoir oil chamber S6 and the rest of the oil flows into the third oil chamber S5. Specifically, as shown by chain-line arrows in FIG. 6, part of the oil supplied to the first oil chamber S3 passes the compression-side inlet oil paths 47*b* of the compression-side valve seat member 47 from the first oil chamber S3, pushing and opening the compression-side valve 46 formed of plural disc valves to flow into the second oil chamber S4. On the other hand, the rest of the oil flowing into the first oil chamber S3 flows into the second oil chamber S4 through the gap between the valve body 52 and the valve seat 50*f* and so on. At this time, the oil passing the compression-side valve 46 joins the oil flowing from the first oil chamber S3 through the gap between the valve body 52 and the valve seat 50*f* and so on, flowing into the second oil chamber S4. In the oil flowing into the second oil chamber S4, the oil as part of the above, which corresponds to the volume of the piston rod 3 which is inserted into the cylinder 2 flows into the reservoir oil chamber S6, and the rest of the oil passes the compression-side outlet oil paths 43*c* of the extension-side valve seat member 43, pushing and opening the compression-side outlet check valve 42 arranged in an outlet part of the compression-side outlet oil paths 43*c* to flow into the third oil chamber S5. The oil flowing into the third oil chamber S5 flows into the rod-side oil chamber S2 from the third oil chamber S5 through the flow path 23 shown in FIG. 1, the oil holes 22 formed in the outer cylinder 2*b* of the cylinder 2, the flow path 20 between the inner cylinder 2*a* and the outer cylinder 2*b* and the oil holes 21 formed in the inner cylinder 2*a*. At this time, a compression-side damping force is generated in the shock absorber 1 due to the flow resistance generated when the oil passes the compression-side valve 46.

As shown by dashed-line arrows in FIG. 6, part of the oil supplied to the first oil chamber S3 passes the oil path 50*h* formed in the valve body housing member 50, pushing and opening the compression-side check valve 58 (see FIG. 4) arranged in an outlet part of the oil path 50*h* to flow into the oil chamber 55. The oil flowing into the oil chamber 55 further flows into the oil chamber 59 inside the middle diameter hole 50*e* of the valve body housing member 50, opening the valve body 52 pressed in the valve closing direction by the solenoid actuator 60 and passing the oil path 49*e*, the oil path 49*f* and the oil path 49*g* formed in the second flow path member 49, then, flowing into the second oil chamber S4 through the oil path 45*b* formed in the first flow path member 45 to join the oil passing the compression-side valve 46.

In the above flow of the oil, the valve body 52 is pushed and opened in the balance between the force in the valve closing direction acting on one end side by the solenoid actuator 60 and the force in the valve opening direction acting on the other end side by the coil spring 53. At this time, electric current supplied to the solenoid actuator 60 is changed, the thrust generated in the solenoid actuator 60 is adjusted and the force in the valve closing direction of the valve body 52 to the valve seat portion 50*i* is controlled, thereby changing an aperture of the valve body 52 (a valve opening pressure of the valve body 52). The electric current to be supplied to the solenoid actuator 60 is changed to adjust the aperture of the valve body 52 as described above, thereby adjusting the flow resistance of the oil passing the gap between the seating portion 52*i* of the valve body 52 and the valve seat portion 50*i*. Accordingly, the size of the damping force generated when the oil passes the gap between the valve body 52 and the valve seat portion 50*i* can be adjusted.

Specifically, when the electric current supplied to the solenoid actuator 60 is small, the pressing force applied to the valve body 52 by the thrust of the solenoid actuator 60 toward the valve seat portion 50*i* is small, therefore, the valve opening pressure of the valve body 52 is also reduced. Accordingly, the aperture of the valve body 52 is increased, and the flow resistance of the oil flowing in the valve body 52 is reduced. As a result, the compression-side damping force generated by the flow resistance is also reduced.

Conversely, when the electric current supplied to the solenoid actuator 60 is large, the pressing force applied to the valve body 52 by the thrust of the solenoid actuator 60 toward the valve seat portion 50*i* is large, and the valve opening pressure of the valve body 52 is also increased. Accordingly, the aperture of the valve body 52 is reduced, the oil flowing in the valve body 52 is restricted, and the flow resistance of the oil is increased. As a result, the compression-side damping force generated by the flow resistance is also increased.

In the damping force generating apparatus 40, the valve seat 50*f* on which the valve body 52 is seated is formed of the elastic body which can be elastically deformed in the valve closing direction (one end side) of the valve body 52 by the oil pressure inside the oil chamber 59. Accordingly, for example, when the oil pressure inside the oil chamber 59 is suddenly increased from the valve closed state, the inner peripheral portion including the valve seat portion 50*i* of the valve seat 50*f* is bent by the oil pressure inside the oil chamber 59 to allow the flow of the oil. Therefore, even when response delay of the valve body 52 occurs by the inertia acted on the plunger 66 and so on, occurrence of phenomena in which the damping force overshoots or the opening degree of the valve varies by self-excited vibration of the valve body 52 and the damping force oscillates to be unstable can be suppressed by generating the flow of the oil.

During the compression stroke, the quantity of the oil corresponding to the volume of the piston rod 3 which is inserted into the inner cylinder 2*a* of the cylinder 2 is supplied from the second oil chamber S4 to the reservoir oil chamber S6 (see FIG. 1) of the reservoir 30 through the communication path 26*b* as shown in chain-line arrows in FIG. 6. Accordingly, the bladder 32 of the reservoir 30 contracts and the gas inside the bladder 32 is compressed. Due to the compression of the gas, variation of capacity inside the inner cylinder 2*a* caused by entering of the piston rod 3 into the inner cylinder 2*a* of the cylinder 2 is compensated.

(Extension Stroke)

Next, the operation of the shock absorber 1 during the extension stroke will be explained with reference to FIG. 7.

During the extension stroke in which the piston rod 3 moves downward relatively with respect to the cylinder 2, the piston 11 moves downward in the inner cylinder 2*a* of the cylinder 2 with the piston rod 3. Accordingly, oil inside the rod-side oil chamber S2 is compressed by the piston 11 and the pressure thereof is increased. Then, the oil inside the rod-side oil chamber S2 is supplied to the third oil chamber S5 of the damping force generating apparatus 40 shown in FIG. 7 through the oil holes 21 formed in the inner cylinder 2*a* shown in FIG. 1, the flow path 20 between the inner cylinder 2*a* and the outer cylinder 2*b*, the oil holes 22 and the flow path 23 formed in the outer cylinder 2*b*.

The oil supplied to the third oil chamber S5 of the damping force generating apparatus 40 flows into the second oil chamber S4 during the extension stroke, joining the oil flowing from the reservoir oil chamber S6 to flow into the first oil chamber S3. Specifically, as shown by chain-line arrows in FIG. 7, part of the oil supplied to the third oil chamber S5 passes the extension-side inlet oil paths 43*b* of the extension-side valve seat member 43 from the third oil chamber S5, pushing and opening the extension-side valve 44 provided in an outlet part of the extension-side inlet oil paths 43*b* to flow into the second oil chamber S4. On the other hand, the rest of the oil supplied to the third oil chamber S5 flows into the second oil chamber S4 through the gap between the valve body 52 and the valve seat 50*f* and so on. At this time, the oil passing the extension-side valve 44, the gap between the valve body 52 and the valve seat 50*f* and so on joins the oil corresponding to the volume of the piston rod 3 which is retracted from the cylinder 2 and flowing from the reservoir oil chamber S6, flowing into the second oil chamber S4. The oil flowing into the second oil chamber S4 passes the extension-side outlet oil path 47*c* of the compression-side valve seat member 47, opening and pushing the extension-side outlet check valve 48 provided in the outlet part of the extension-side outlet oil path 47*c* to flow into the first oil chamber S3. Then, the oil flowing into the first oil chamber S3 passes the oil hole 19 shown in FIG. 1 from the first oil chamber S3 and flows into the piston-side oil chamber S1. At this time, an extension-side damping force is generated in the shock absorber 1 due to the flow resistance generated when the oil passes the extension-side valve 44.

As shown by dashed-line arrows in FIG. 7, part of the oil supplied to the third oil chamber S5 passes the oil path 49*c* and the oil path 49*d* in the second flow path member 49, pushing and opening the extension-side check valve 56 (see FIG. 4) arranged in an outlet part of the oil path 49*d* to flow into the oil chamber 55. The oil flowing into the oil chamber 55 further flows into the oil chamber 59 inside the middle diameter hole 50*e* formed in the valve body housing member 50, opening the valve body 52 pressed in the valve closing direction by the solenoid actuator 60, passing the oil path 49*e*, the oil path 49*f* and the oil path 49*g* formed in the second flow path member 49, flowing into the second oil chamber S4 through the oil path 45*b* formed in the first flow path member 45 and joining the oil passing the extension-side valve 44.

In the above flow of the oil, the valve body 52 is pushed and opened in the balance between the force in the valve closing direction acting on one end side by the solenoid actuator 60 and the force in the valve opening direction acting on the other end side by the coil spring 53. At this time, electric current supplied to the solenoid actuator 60 is changed, the thrust generated in the solenoid actuator 60 is adjusted and the force in the valve closing direction of the valve body 52 to the valve seat portion 50*i* is controlled, thereby changing the aperture of the valve body 52 (the valve opening pressure of the valve body 52). The electric current to be supplied to the solenoid actuator 60 is changed and the aperture of the valve body 52 is adjusted as described above, thereby adjusting the flow resistance of the oil passing the gap between the seating portion 52*i* of the valve body 52 and the valve seat portion 50i. Accordingly, the size of the damping force generated when the oil passes the gap between the valve body 52 and the valve seat portion 50i can be adjusted.

Specifically, when the electric current supplied to the solenoid actuator 60 is small, the pressing force of the valve body 52 to the valve seat portion 50i by the thrust of the solenoid actuator 60 is small, therefore, the valve opening pressure of the valve body 52 is also reduced. Accordingly, the aperture of the valve body 52 is increased and the flow resistance of the oil flowing in the valve body 52 is reduced, as a result, the extension-side damping force generated by the flow resistance is also reduced.

Conversely, when the electric current supplied to the solenoid actuator 60 is large, the pressing force of the valve body 52 to the valve seat portion 50i by the thrust of the solenoid actuator 60 is large and the valve opening pressure of the valve body 52 is also increased. Accordingly, the aperture of the valve body 52 is reduced, the oil flowing in the valve body 52 is restricted and the flow resistance of the oil is increased, as a result, the extension-side damping force generated by the flow resistance is also increased.

In the damping force generating apparatus 40, the valve seat 50f on which the valve body 52 is seated is formed of the elastic body which can be elastically deformed in the valve closing direction (one end side) of the valve body 52 by the oil pressure. Accordingly, also during the extension stroke, for example, when the oil pressure is suddenly increased from the valve closed state, the inner peripheral portion including the valve seat portion 50i of the valve seat 50f is bent by the oil pressure to allow the flow of the oil. Therefore, even when response delay of the valve body 52 occurs by the inertia acted on the plunger 66 and so on, the occurrence of phenomena in which the damping force overshoots or the valve aperture varies by self-excited vibration of the valve body 52 and the damping force oscillates to be unstable can be suppressed by generating the flow of the oil.

During the extension stroke, the quantity of the oil corresponding to the volume of the piston rod 3 which is retracted from the inner cylinder 2a of the cylinder 2 flows from the reservoir oil chamber S6 (see FIG. 1) of the reservoir 30 into the second oil chamber S4 through the communication path 26b and joins oil passing the extension-side valve 46 as shown by chain-line arrows in FIG. 7. The oil joining the oil flowing in the main flow path passes the extension-side outlet oil path 47c of the compression-side valve seat member 47 from the second oil chamber S4, pushing and opening the extension-side outlet check valve 48 provided in an outlet part of the extension-side outlet oil path 47c to flow into the first oil chamber S3. Then, the oil flowing into the first oil chamber S3 flows into the piston-side oil chamber S1 from the first oil chamber S3 through the oil hole 19 shown in FIG. 1. Accordingly, the bladder 32 of the reservoir 30 is expanded, and gas inside the bladder 32 is expanded. Due to expansion of the gas, capacity variation inside the inner cylinder 2a caused by retraction of the piston rod 3 from the inner cylinder 2a of the cylinder 2 is compensated.

(In Case of Failure)

In case of a failure where the solenoid actuator 60 is not normally operated, thrust (electromagnetic force) for moving the valve body 52 in the valve closing direction (one end side) against the coil spring 53 which biases the valve body 52 in the valve opening direction is not generated. Therefore, the valve body 52 moves in the valve opening direction (the other end side) by the biasing force of the coil spring 53.

Here, when the shock absorber does not have a fail-safe function, the valve body 52 is fully opened and the flow resistance of the oil passing the valve body 52 is reduced, which sharply reduces the compression-side and the extension-side damping forces and impairs operation stability of the motorcycle.

In the shock absorber 1 according to the embodiment, the large diameter portion 52e formed in the tip portion (end portion of one end side) of the needle portion 52b of the valve body 52 is stopped in a position close to the valve seat 50f of the valve body housing member 50 in a state where the valve body 52 moves furthest in the valve opening direction (state where the coil spring 53 is most extended inside the space of the valve body back pressure chamber 70, the large diameter hole 50c and the groove 50g). In this state, a slight gap in which the flow path is narrowed is formed between a portion different from the valve seat portion 50i in the valve seat 50f and the large diameter portion 52e, and the gap allows the flow of the oil. Due to the flow resistance generated when the oil flows in the gap, a damping force is generated and the fail-safe function is fulfilled. That is, the sharp reduction in the damping force due to the sudden increase of the oil passing the valve body 52 is prevented and thus the reduction in the operation stability of the motorcycle is prevented.

In case of the failure, the damping force is generated due to the flow resistance generated by the gap formed between the large diameter portion 52e of the valve body 52 and one end side of the valve seat 50f, and the pressure is increased in the upstream side of the gap, and the pressure is reduced in the downstream side. Therefore, the upstream side of the gap between the large diameter portion 52e of the valve body 52 and one end side of the valve seat 50f becomes the first flow path 91 and the downstream side becomes the second flow path 92 in this case, which differs from the normal state.

As described above, in the shock absorber 1 according to the embodiment an oil pressure in the first flow path 91 including the oil chamber 59 and the like as the upstream side is relatively higher than an oil pressure in the second flow path 92 including the oil chamber 59a, the oil path 49e, the oil path 49f and so on as the downstream side. Accordingly, an oil pressure of the valve body back pressure chamber 70 communicated to the second flow path 92 is the same as the oil pressure of the second flow path 92, therefore, the oil pressure of the first flow path 91 is relatively higher than the oil pressure of the valve body back pressure chamber 70. Here, the pressure receiving portion 81 which is at least a part of the valve body 52 receives the pressure in the valve opening direction by the oil pressure of the first flow path 91, the pressure receiving portion 82 which is at least a part of the valve body 52 and which is different from the pressure receiving portion 81 receives the pressure in the valve closing direction by the oil pressure of the second flow path 92, and further, the pressure receiving area of the pressure receiving portion 81 and the pressure receiving area of the pressure receiving portion 82 are the same, therefore, the valve body 52 is pressed in the valve opening direction with a load corresponding to the difference of a pressure obtained by subtracting the oil pressure of the second flow path 92 in the pressure receiving portion 82 from the oil pressure of the first flow path 91 in the pressure receiving portion 81. The valve body 52 also receives the thrust in the valve closing direction by the solenoid actuator 60. The valve body 52 further receives the elastic force in the valve opening direction by the coil spring 53. That is, the valve body 52 is opened/closed to/from the valve seat portion 50*i* in the balance among the load in the valve opening direction corresponding to the difference of the pressure obtained by subtracting the oil pressure of the second flow path 92 in the pressure receiving portion 82 from the oil pressure of the first flow path 91 in the pressure receiving portion 81, the thrust of the solenoid actuator 60 in the valve closing direction and the elastic force of the coil spring 53 in the valve opening direction.

Here, in the case where the thrust of the solenoid actuator 60 in the valve closing direction is higher than the load in the valve opening direction corresponding to the difference obtained by subtracting the oil pressure of the second flow path 92 in the pressure receiving portion 82 from the oil pressure of the first flow path 91 in the pressure receiving portion 81 and the elastic force of the coil spring 53 in the valve opening direction as well as in the case where the elastic deformation of the valve seat 50*f* due to the load corresponding to the difference of the pressure obtained by subtracting the oil pressure of the second flow path 92 from the oil pressure of the first flow path 91 is small, the valve body 52 follows the elastic deformation of the valve seat 50*f*. Accordingly, the valve body 52 and the valve seat portion 50*i* are maintained while being sealed, the oil does not flow from the first flow path 91 to the second flow path 92.

On the other hand, in the case where the thrust of the solenoid actuator 60 in the valve closing direction is higher than the load in the valve opening direction corresponding to the difference obtained by subtracting the oil pressure of the second flow path 92 in the pressure receiving portion 82 from the oil pressure of the first flow path 91 in the pressure receiving portion 81 and the elastic force of the coil spring 53 in the valve opening direction as well as in the case where the elastic deformation of the valve seat 50*f* due to the load corresponding to the difference of the pressure obtained by subtracting the oil pressure of the second flow path 92 from the oil pressure of the first flow path 91 is large, the valve body 52 is separated without following the elastic deformation of the valve seat 50*f*. Accordingly, the gap is generated between the valve body 52 and the valve seat portion 50*i*, and the oil flows from the first flow path 91 to the second flow path 92.

Furthermore, in the case where the thrust of the solenoid actuator 60 in the valve closing direction is lower than the load in the valve opening direction corresponding to the difference obtained by subtracting the oil pressure of the second flow path 92 in the pressure receiving portion 82 from the oil pressure of the first flow path 91 in the pressure receiving portion 81 and the elastic force of the coil spring 53 in the valve opening direction, the valve body 52 moves and separates from the valve seat portion 50*i*. Accordingly, the gap is generated between the valve body 52 and the valve seat portion 50*i*, and the oil flows from the first flow path 91 to the second flow path 92. At this time, even when the valve body 52 is not appropriately opened from the valve seat portion 50*i* as the thrust of the solenoid actuator 60 is not appropriately transmitted to the valve body 52 due to the inertia of the plunger 66 and the like and the response delay occurs in the valve body 52, the gap is generated between the valve body 52 and the valve seat 50*f* as the valve seat 50*f* is elastically deformed in the valve closing direction, thereby allowing the oil to flow from the first flow path 91 to the second flow path 92.

As described above, in the shock absorber 1 according to the embodiment, the oil can flow from the first flow path 91 to the second flow path 92 as the valve seat 50*f* is elastically deformed even when the response delay occurs in the valve body 52 due to the inertia and so on acted on the plunger 66, therefore, the occurrence of phenomena in which the damping force overshoots or the valve aperture varies by the self-excited vibration of the valve body 52 and the damping force oscillates to be unstable can be suppressed.

Also in the shock absorber 1 according to the embodiment, the natural frequency of the valve seat 50*f* is higher than the natural frequency of the valve body 52. Accordingly, occurrence of self-excited vibration in the valve body 52 can be prevented.

Also in the shock absorber 1 according to the embodiment, possibility of contamination intrusion into the plunger chamber 61, the oil reservoir chamber 71 and the valve body back pressure chamber 70 with the oil can be reduced. For example, possibility that contamination is caught in the plunger 66, the sliding portion of the working rod 67 and so on to affect the driving of the valve body 52 can be reduced. Furthermore, possibility that air bubbles are mixed into the plunger chamber 61, the oil reservoir chamber 71 and the valve body back pressure chamber 70, namely, the occurrence of air entrainment can be reduced.

Also in the shock absorber 1 according to the embodiment, the damping force generating apparatus 40 includes the compression-side valve 46 generating the damping force during the compression stroke and the extension-side valve 44 generating the damping force during the extension stroke. That is, a structure in which the damping force is generated is separately provided in addition to a structure in which the damping force is generated by including the damping force variable device having the seating portion 52*i* of the valve body 52 and the valve seat portion 50*i* of the valve seat 50*f*, which increases freedom in adjustment of the damping force.

Also in the shock absorber 1 according to the embodiment, the second oil chamber S4 which is the downstream side flow path of the oil flowing in the position where the damping force is generated during the compression stroke as well as the downstream side flow path of the oil flowing in the position where the damping force is generated during the extension stroke is communicated to the reservoir 30. Therefore, the oil in one of the oil chambers in which the oil pressure is higher than the other (the piston-side oil chamber S1 in the upstream side during the compression stroke/the rod-side oil chamber S2 in the upstream side during the extension stroke) passes only the compression-side valve 46 and the gap between the valve body 52 and the valve seat 50*f* during the compression stroke, and passes only the extension-side valve 44 and the gap between the valve body 52 and the valve seat 50*f* during the extension stroke. That is, the oil in the oil chamber in which the oil pressure is higher surely passes only each position where the damping force is generated during each stroke and does not branch to other places in the upstream side of the position where the damping force is generated during both strokes of the compression stroke and the extension stroke, therefore, a desired damping force can be obtained easily and stably by setting these positions where the damping force is generated.

Furthermore, during both strokes of the compression stroke and the extension stroke, the rod-side oil chamber S2 in the downstream side in the position where the damping force is generated during the compression stroke and the piston-side oil chamber S1 in the downstream side in the position where the damping force is generated during the extension stroke are communicated to the reservoir oil chamber S6 not through a diaphragm, and pressures in these downstream side chambers are maintained in the same pressure as the pressure (the sealing pressure in the gas chamber) in the reservoir oil chamber S6. Therefore, the reversal response from the extension stroke to the compression stroke and the reversal response from the compression stroke to the extension stroke (delay of occurrence of the compression-side damping force/extension-side damping force due to oil elasticity and air bubbles) are determined only by the sealing pressure of the gas chamber and stabilized.

The shock absorber 1 according to the embodiment includes the coil spring 53 biasing the valve body 52 in the valve opening direction. Accordingly, for example, in case of the failure of the solenoid actuator 60, the valve body 52 can be positively moved from the valve seat 50*f* in the valve opening direction by the biasing force of the coil spring 53. Then, when the valve body 52 moves furthest from the valve seat portion 50*i* in the valve opening direction, the gap in which the flow path is narrowed is formed between at least a part (large diameter portion 52*e*) of the valve body 52 and a portion different from the valve seat portion 50*i* of the valve seat 50*f*, and the damping force is generated when the oil flows in the gap. That is, even when the valve body 52 moves furthest from the valve seat portion 50*i* in the valve opening direction in a case where, for example, the thrust with respect to the valve body 52 in the valve closing direction is lost due to the failure of the solenoid actuator 60, the gap is formed between at least a part of the valve body 52 and the valve seat 50*f*, and the portion where the flow path is narrowed is formed not only in the valve seat portion 50*i* but also between the valve body 52 and the valve seat 50*f*. Therefore, the damping force is positively generated by the gap.

Also in the embodiment, a structure in which the damping force is additionally varied by including the valve arranged in parallel to the extension-side valve 44 and the compression-side valve 46 formed of disc valves without having a pilot structure has been explained. However, it is natural that a similar structure similar may be applied to a pilot valve. For example, the valve body 52, the valve seat 50*f* and so on according to the present invention may naturally be applied to a damping force adjusting portion in a shock absorber including a damping force generating mechanism having one main valve, one pilot chamber allowing an inner pressure in a valve closing direction to act onto the one main valve and the damping force generating portion which adjusts the inner pressure of the pilot chamber.

Also in the embodiment, the example in which the present invention is applied to the shock absorber 1 which is used as the rear cushion for the motorcycle configured by providing the damping force generating apparatus 40 at the outside of the cylinder 2 has been explained. However, the present invention can also be applied to a shock absorber used as a rear cushion configured by including a damping force generating apparatus 40 in a piston 11 inside a cylinder 2 in a compact manner. When the damping force generating apparatus 40 is provided inside the piston 11 as described above, the damping force generating apparatus 40 can be configured in the compact manner so as not to protrude to the outside of a shock absorber 1.

Further in the embodiment, the example in which the present invention is applied to the inverted shock absorber configured by attaching the cylinder to the vehicle body side and attaching the piston rod to the axle side has been explained. It is natural that the present invention can be applied to an upright shock absorber configured by attaching a piston rod to a vehicle body side and attaching a cylinder to an axle side in the same manner.

It is also natural that the present invention can obtain the same effects as described above by being applied to a shock absorber as a front fork of a motorcycle which is configured by providing the damping force generating apparatus outside the cylinder, an inner tube or an outer tube as well as a shock absorber used as a front fork which is configured by installing a damping force generating apparatus in a piston inside a cylinder, an inner tube or an outer tube in a compact manner. The present invention can naturally be applied to a structure in which a piston directly slides on an inner tube in a similar way to the structure including the cylinder and the piston which is slidably fitted into the cylinder as in the claims.

In the embodiment, the example in which the present invention is applied to the shock absorber used as the rear cushion suspending a rear wheel of a motorcycle with respect to a vehicle body has been explained. Furthermore, the present invention can be naturally applied to a shock absorber suspending a wheel of any vehicles other than the motorcycle in a same manner.

Some embodiments of the present invention have been explained, and these embodiments have been cited as examples, which do not intend to limit scope of the invention. These novel embodiments can be achieved in other various forms, and various omissions, alterations and modifications may occur within scope not departing from a gist of the invention. These embodiments and modifications thereof are included in the range and the gist of the invention as well as included in inventions described in claims and equivalents thereof.

What is claimed is:

1. A shock absorber comprising:
   a cylinder in which oil is sealed;
   a piston slidably fitted into the cylinder;
   a piston rod connected to the piston and extending to an outside of the cylinder; and
   a damping force generating apparatus controlling a flow of the oil generated by a sliding movement of the piston inside the cylinder, wherein
   the damping force generating apparatus comprises;
      a valve body generating damping force by being opened and closed on a flow path in which the oil flows,
      a valve seat closing the flow path when the valve body is seated, and
      an actuator generating thrust to the valve body in a valve closing direction,
   the valve seat comprises a first elastic body which is elastically deformable in the valve closing direction of the valve body and a valve seat portion on which the valve body is seated,
   the flow path comprises;
      a first flow path provided in an upstream side in an oil flow direction with respect to the valve seat portion,
      a second flow path provided in a downstream side in the oil flow direction with respect to the valve seat portion, and
      a valve body back pressure chamber communicated to the second flow path and allowing an oil pressure to act on the valve body in the valve closing direction,
   a first pressure receiving portion which is at least a part of the valve body receives a pressure in a valve opening direction by an oil pressure of the first flow path,
   a second pressure receiving portion which is at least a part of the valve body and which is different from the first pressure receiving portion receives a pressure in the valve closing direction by the oil pressure of the valve body back pressure chamber communicated to the second flow path, and a pressure receiving area of the first pressure receiving portion is equal to a pressure receiving area of the second pressure receiving portion.

2. The shock absorber according to claim 1,
wherein the valve body comprises a seating portion seated on the valve seat portion, and
a diameter of the seating portion is smaller than a maximum diameter of the first pressure receiving portion.

3. The shock absorber according to claim 1, further comprising
a piston-side oil chamber positioned at a side of the piston of two oil chambers which are sectioned by the piston inside the cylinder,
a rod-side oil chamber positioned at a side of the piston rod of the two oil chambers which are sectioned by the piston inside the cylinder, and
a reservoir compensating a volume of the piston rod which is inserted into or retracted from the cylinder,
wherein the second flow path is communicated to the reservoir.

4. The shock absorber according to claim 3,
wherein the damping force generating apparatus further comprises a compression-side valve generating the damping force during a compression stroke and an extension-side valve generating the damping force during an extension stroke.

5. The shock absorber according to claim 4,
wherein the reservoir is provided in a downstream side of the compression-side valve during the compression stroke and in a downstream side of the extension-side valve during the extension stroke.

6. The shock absorber according to claim 1,
wherein a gap at which the flow path is narrowed is formed between at least a part of the valve body and the valve seat when the valve body moves furthest from the valve seat portion in the valve opening direction, and
wherein the damping force is generated when the oil flows in the gap.

7. The shock absorber according to claim 1,
wherein a natural frequency of the valve seat is higher than a natural frequency of the valve body.

8. The shock absorber according to claim 1, further comprising a second elastic body biasing the valve body in a valve opening direction.

* * * * *